United States Patent [15] 3,658,347

Cheeseboro [45] Apr. 25, 1972

[54] SLOT-LOADING PORTABLE RECORD PLAYER

[72] Inventor: Robert G. Cheeseboro, Los Angeles, Calif.

[73] Assignee: Cheeseboro Products Corporation, Los Angeles, Calif.

[22] Filed: May 13, 1970

[21] Appl. No.: 37,056

Related U.S. Application Data

[63] Continuation of Ser. No. 600,923, Dec. 12, 1966, abandoned.

[52] U.S. Cl. .....274/9 B
[51] Int. Cl. .....G11b 25/04
[58] Field of Search .....274/9

[56] References Cited

UNITED STATES PATENTS 2,943,861 7/1960 Redfield .....274/9
2,927,794 3/1960 Carson .....274/9
2,905,479 9/1959 Cheeseboro .....274/9

FOREIGN PATENTS OR APPLICATIONS 961,548 6/1964 Great Britain .....274/39

*Primary Examiner*—Harry N. Haroian
*Attorney*—Christie, Parker & Hale

[57] ABSTRACT

A slot-loading record player in which a single reversible motor is provided for moving a record support turntable along the axis of turntable rotation into engagement with a record to clamp the record between the turntable and a record clamp disc disposed coaxially of the turntable and for rotating the turntable in a record playing direction when the motor is operated in one direction, and for removing the turntable from clamping engagement with the record when the motor is operated in the reverse direction.

27 Claims, 19 Drawing Figures

INVENTOR.
ROBERT G. CHEESEBORO

BY

Christie, Parker & Hale
ATTORNEYS.

PATENTED APR 25 1972

3,658,347

SHEET 2 OF 8

INVENTOR.
ROBERT G. CHEESEBORO
BY
Christie, Parker & Hale
ATTORNEYS.

INVENTOR.
ROBERT G. CHEESEBORO
Christie, Parker & Hale
ATTORNEYS.

INVENTOR.
ROBERT G. CHEESEBORO
BY
Christie, Parker & Hale
ATTORNEYS.

SLOT-LOADING PORTABLE RECORD PLAYER

CROSS REFERENCE TO RELATED APPLICATIONS

This application is a continuation of my earlier filed copending application, Ser. No. 600,923 filed Dec. 12, 1966 now abandoned.

This invention pertains to a portable, attitude insensitive phonograph having slot-loading capability and featuring a single motor effective both to rotate a phonograph record supporting turntable and to operate a mechanism for clamping, positioning, playing, and for rejecting a record.

My prior U.S. Pat. No. 2,905,475 describes a slot-loaded portable phonograph having an automatic record clamp and reject feature. A phonograph in accord with this patent requires one motor for rotating the record turntable and a second motor for operating the record clamp and reject mechanism. The presence of two motors results in a heavy device.

The present invention utilizes only a single motor to perform all the functions obtained in a phonograph according to my prior patent. The invention, therefore, provides a lighter, more compact and more truly portable phonograph than is taught by my prior patent. Also, the present invention provides many improvements which assure a more accurate operation of the phonograph over a longer period of time.

Briefly summarized, the present invention resides in an attitude insensitive phonograph which includes a rotatable turntable for supporting a phonograph record, the turntable being mounted for rotation about and movement along its axis of rotation. Stop means are provided for defining a limit of movement of the turntable along its axis of rotation. Turntable drive means, including a single motor, are provided for moving the turntable along its axis toward and away from the limit, and for rotating the turntable at a selected angular velocity when the turntable is at the limit and constrained from movement along its rotational axis. The phonograph also includes a rotatable record clamp disc. The clamp disc is disposed coaxially of the turntable and is engageable, substantially at the limit of turntable axial movement, with a record supported on the turntable for clamping the record to the turntable.

The above-mentioned and other features of the invention are more fully set forth in the following detailed description of the invention presented with reference to the accompanying drawings, wherein:

FIG. 3 is a cross-sectional elevation view taken along line 3—3 of FIG. 2;

Figure 16A:
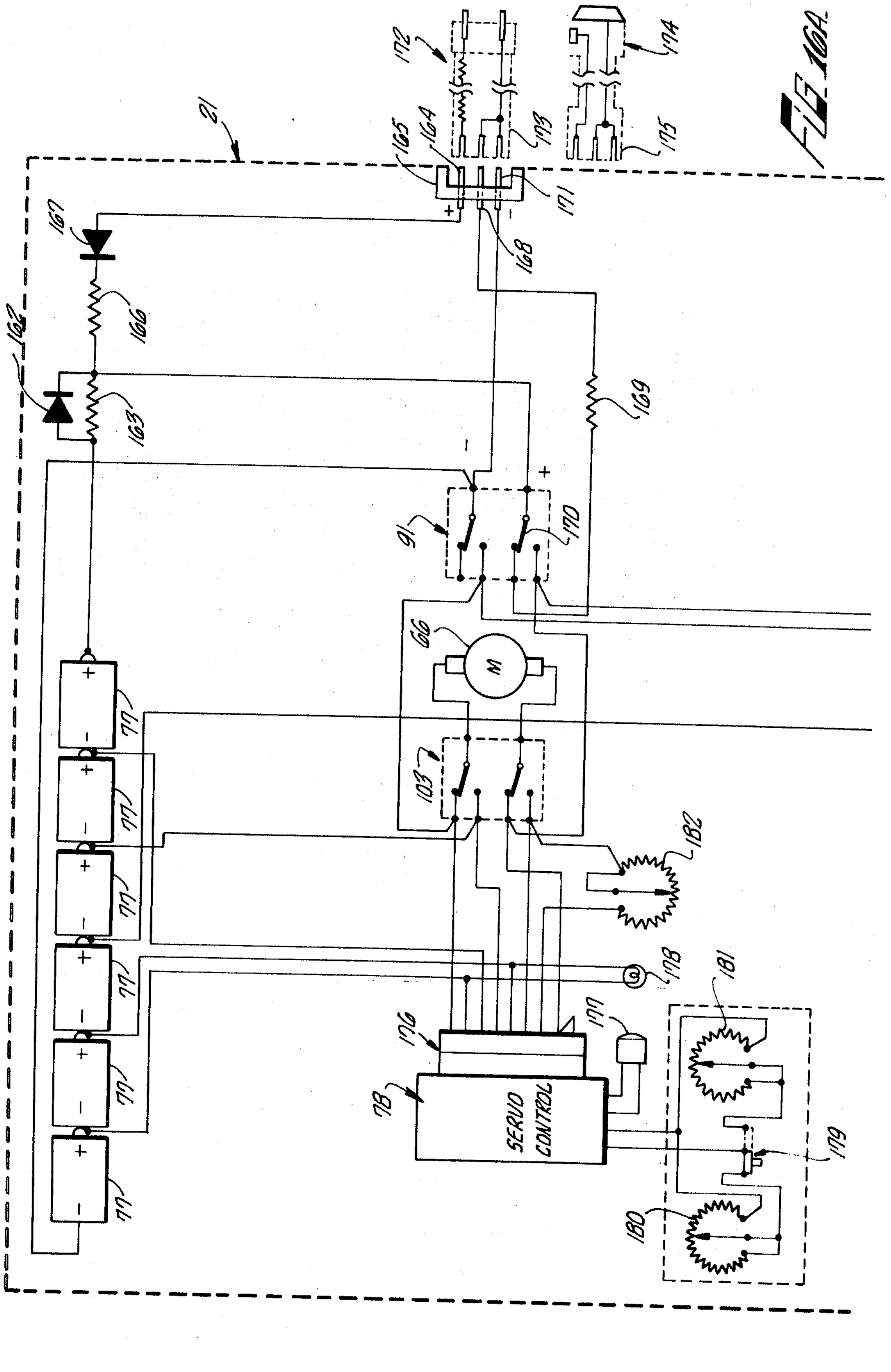
Figure 16B:
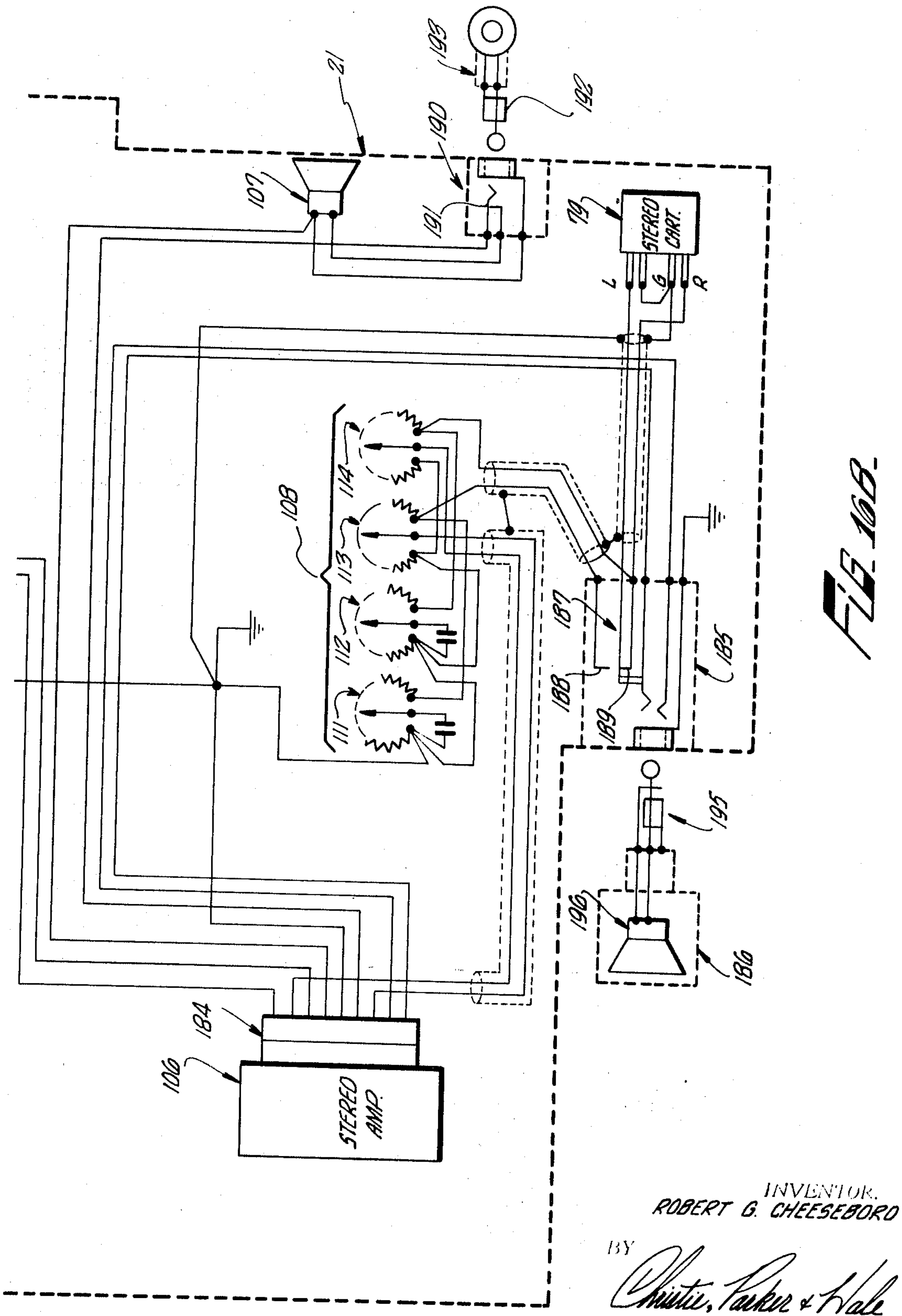
Figure 17:
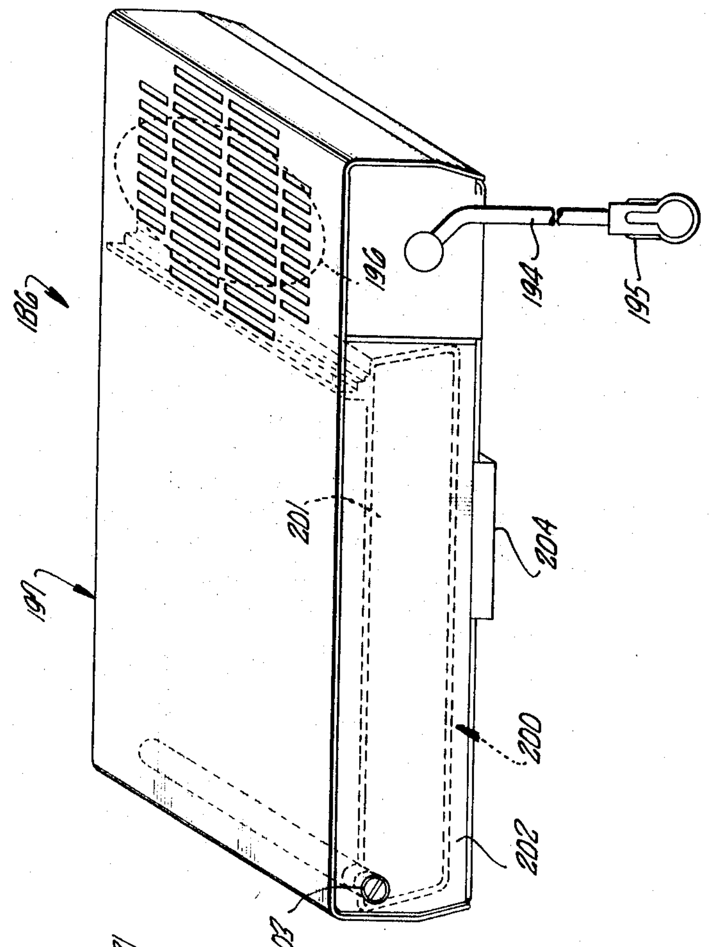
Figure 18:
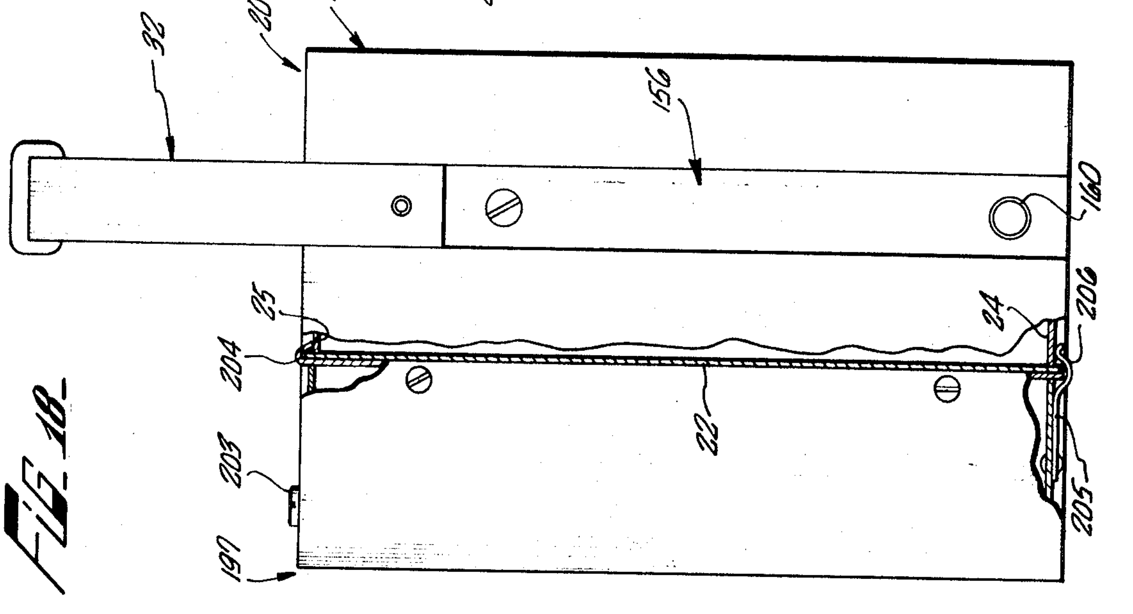

FIGS. 16A and 16B, taken together, constitute a schematic wiring diagram of the phonograph;

FIG. 17 is a perspective view of a remote speaker and record storage unit for the phonograph; and FIG. 18 is a side elevation view showing the speaker and record storage unit connected to the phonograph for carrying of the two units.

Figure 13:
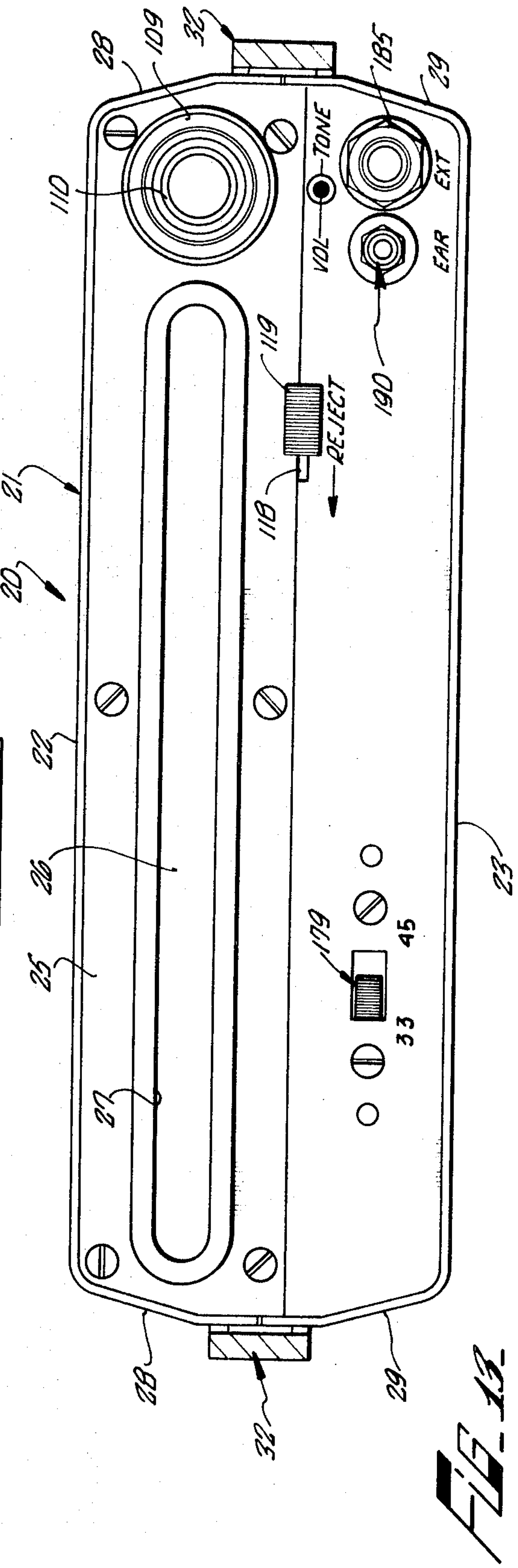
FIG. 13 is a front elevation view of the phonograph.
Figure 14:
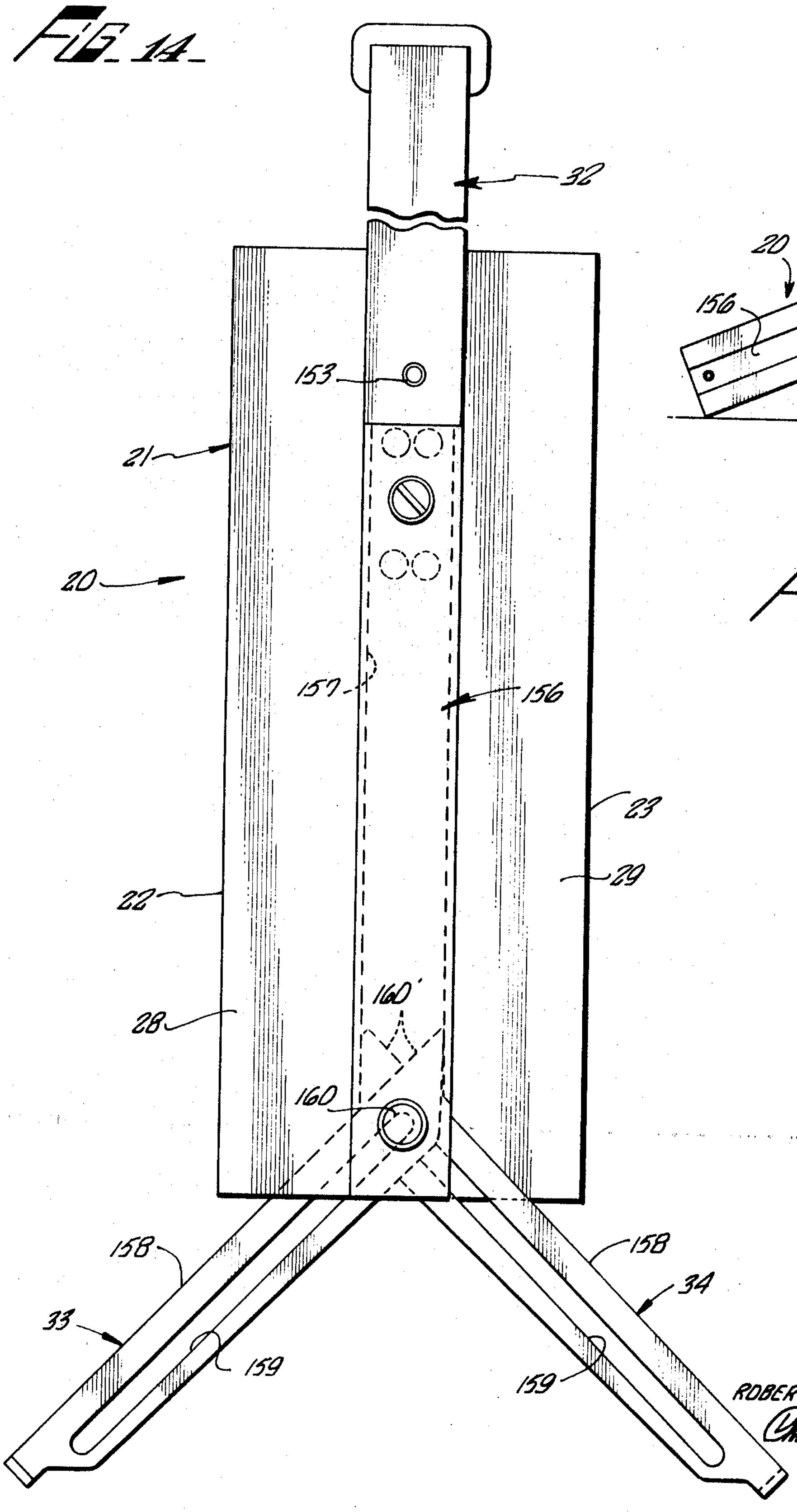
FIG. 14 is a side elevation view of the phonograph.

Referring initially to FIGS. 13 and 14, which show the exterior of a portable stereophonic phonograph 20 for playing 7-inch phonograph records, and to FIGS. 1 through 4, which show the interior of the phonograph, the phonograph has a housing 21 formed by top and bottom plates 22 and 23, a back plate 24 and a front plate 25. A record loading slot 26, having a length of slightly over 7 inches, is formed through the front plate parallel to the upper edge of the plate, as shown in FIG. 13, and is rimmed by a rubber or soft plastic grommet 27. The sides of the housing are formed by cooperating flanges 28 and 29 formed along the side edges of the top and bottom plates, respectively. A chassis plate 30 is supported in a transverse relation in the housing about midway between the top and bottom plates. The chassis plate is secured to the top and bottom plate flanges by screws 31 engaged with marginal flanges of the chassis plate; the chassis plate is similarly mounted to the front and back plates. The chassis plate is made of steel or some other paramagnetic material, and the remaining elements of the housing are preferably made of aluminum.

The housing of the phonograph has a carrying handle 32 mounted to it. Also, a pair of retractible supporting legs 33 and 34 are mounted to the housing.

A record supporting turntable 35 (FIG. 1) is rotatably mounted in the housing between the chassis and top plates for rotation about an axis 36 perpendicular to the length of slot 26; the axis is positioned in the housing inwardly of the midlength of the slot. The turntable is disposed coaxially of a rotatable drive wheel 37 mounted on a supporting shaft 38 secured to the chassis. The drive wheel is secured from axial movement relative to the chassis and has an annularly bored hub 39 which journals shaft 38. The drive wheel has a cylindrical rim 40 concentric to axis 36, the circumference of the rim being of precisely predetermined extent. An externally threaded sleeve 41 is secured to the drive wheel hub concentric to shaft 38 and cooperates with internal threads 42 formed in an axial bore of a boss 43 which depends from the turntable along its axis. The internal threaded bore of the boss opens to the inner one 44A of two concentric recesses 44 and 44A formed coaxially of the boss and open to the upper surface of the turntable. The upper end of sleeve 41 defines a circumferential flange 207 which extends radially outwardly of the upper end of the internally threaded bore in boss 43 in overlying relation to the upper surface of the boss. The flange is engageable with the upper surface of the boss to define the upper limit of travel of the turntable along axis 36. The drive wheel hub and sleeve 41 cooperate to define a secondary turntable support shaft concentric to shaft 38.

Threads 42 are cut so that when the turntable is held from rotation with the drive wheel and the drive wheel is rotated clockwise (looking down on the phonograph as in FIG. 2), the turntable is driven along its axis away from the chassis toward a record clamp disc 45 mounted coaxially above the turntable on a support bracket 46 which extends between the front and the rear portions of the housing adjacent the top plate. The clamp disc is mounted to the support bracket by a clutch and bearing assembly 47 which permits the clamp disc to rotate only clockwise about axis 36, and which also permits the clamp disc to move a limited amount along its axis of rotation. The clutch and bearing assembly is mounted circumferentially about a supporting stud 48, which depends from the support bracket, within an axial bore of the clamp disc. The stud and a central hub 49 of the clamp disc lie within an aperture 50 formed in the support bracket. Movement of the clamp disc downwardly away from the support bracket is assured by a spring washer 142 disposed between the clutch and bearing assembly and the support bracket. Such movement is limited by engagement of a collar 51, carried circumferentially of hub 49, with the upper surface of the bracket around the aperture. Upward movement of the clamp disc is limited by the compression of the spring washer between the clutch and bearing assembly and a lug member 52 which supports stud 48 in aperture 50 relative to the support bracket; the inner race of the clutch and bearing assembly is slidable along stud 48, and the outer race of the assembly is fixed to the clamp disc. Preferably, the clutch and roller assembly is a Torrington RC—061008 roller clutch.

In order that a 7-inch phonograph record 53 may be properly located on the turntable during operation of the phonograph, the turntable carries a spindle assembly 54 which permits records having large or small center holes to be played interchangeably. The spindle assembly is located in turntable recesses 44 and 44A and includes a spindle ring 55 disposed in outer recess 44. The spindle ring is biased away from the turntable by a comparatively weak coil spring 56 engaged between the spindle ring and the bottom of the recess. The outer diameter of the spindle ring is only slightly less than the diameter of a standard large center hole encountered in a 7-inch 45 RPM records. The upper outer rim of the spindle ring is rounded to facilitate centering of the ring in the center hole of a 45 RPM record. The length of the spindle ring is such that the ring can be fully depressed into recess 44 against the bias of spring 56.

The spindle assembly also includes a spindle plug 57 fixed, preferably by press fitting, to the turntable within recess 44A centrally of the spindle ring. The plug has a top surface coplanar with the top surface of the turntable. A short axial projection 58, sized to fit relatively snugly into the standard small center hole of a 7-inch 33-⅓ RPM record, extends upwardly from the spindle plug and serves as a spindle for such a record. The spindle plug is provided with a peripheral flange 59 which projects into recess 44 and which cooperates both with the inner diameter of the spindle ring and with an inwardly extending flange 60 circumferentially of the spindle ring adjacent its lower end; this cooperation both guides the spindle ring relative to the turntable and limits upward movement of the spindle ring relative to the turntable.

The lower end of support stud 48 defines an axial recess 61 for receiving the upper end of spindle projection 58. The clamp disc has a recess 62 formed in its lower surface concentric to axis 36 for receiving the upper end of spindle ring 55 when the spindle ring is effective as a spindle and is not retracted into recess 44 by a record centered on a spindle projection 58, as shown in FIG. 1.

The turntable drive wheel is rotated by a smooth surfaced drive pinion 63 frictionally engaged with the drive wheel rim. Preferably, the surface of the pinion is defined by a hard rubber sleeve 64 (FIG. 2) secured to the pinion shaft 65 (FIG. 1), which shaft is also the output shaft of a printed-circuit motor 66 provided for operating the phonograph. The motor includes a planar, electrically non-conductive rotor 67 having a hub 68 mounted to shaft 65. The rotor hub is positioned in an aperture 69 in the chassis plate. The rotor extends beyond the aperture in close parallelism to the underside of the chassis plate between the chassis plate and an annular motor stator magnet 70. The magnet is disposed concentric to the aperture and is supported on a steel motor pan 71 secured to the chassis plate as shown in FIG. 1. The rotor, the magnet and the motor pan preferably are parts of a 9ZF ferrite DC printed-circuit motor sold by Photocircuits Corporation, Glen Cove, New York.

Figure 1:
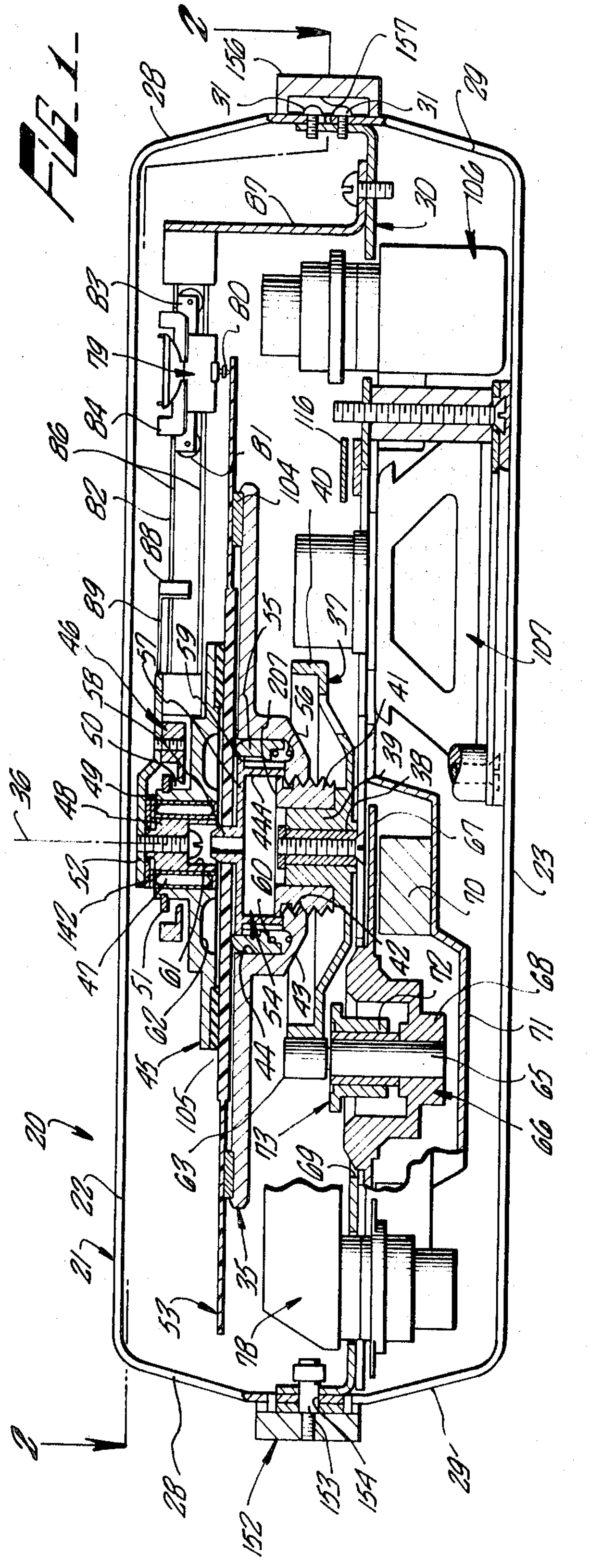
FIG. 1 is a cross-sectional elevation view of a portable, slot-loading, stereophonic, attitude insensitive phonograph.
Figure 2:
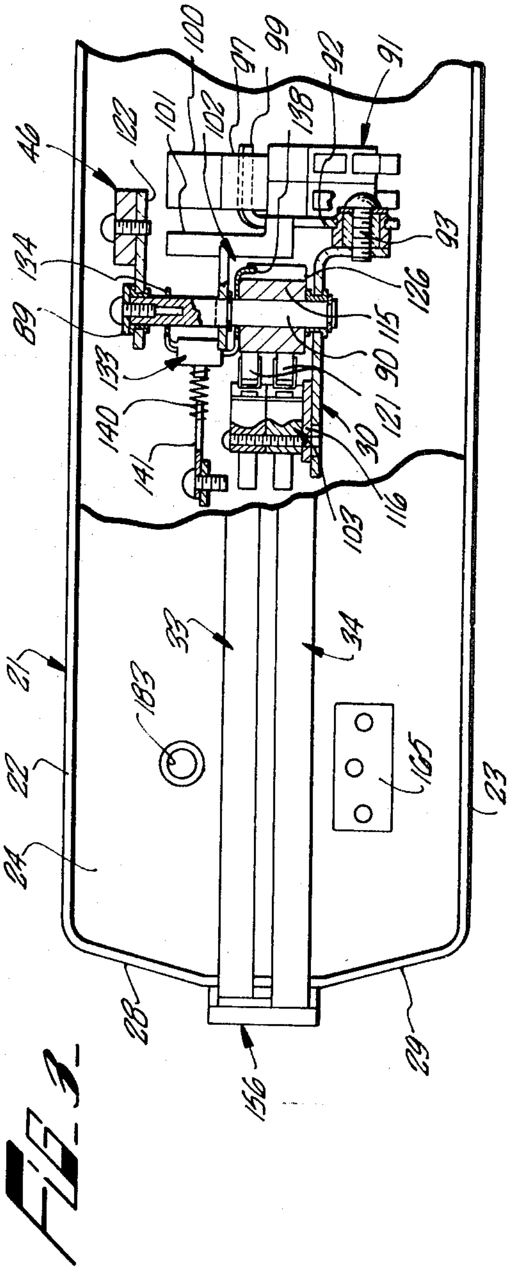
FIG. 2 is a cross-sectional plan view taken along line 2—2 of FIG. 1.
Figure 2:
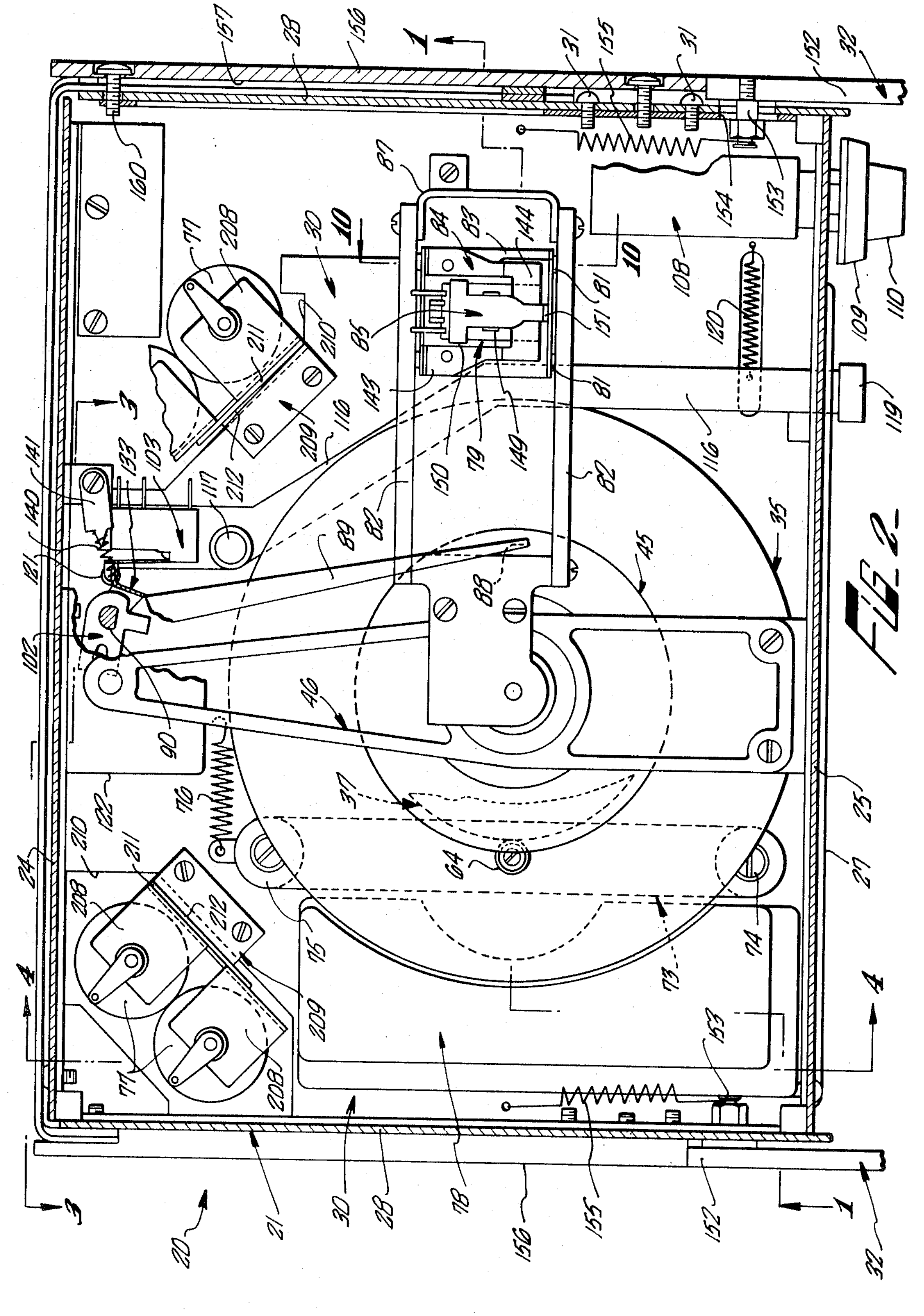

The motor and pinion shaft is rotatably mounted in a depending boss 72 formed at about the middle of an elongate motor support arm 73 (see FIGS. 1 and 2). The motor support arm is located above the chassis plate and is pivotally connected at 74 to the chassis plate adjacent the housing front plate. Pivot 74 is located 90° from axis 36 relative to the axis of pinion 63 in the normal position of the motor support arm. The arm has a rear end 75 to which is connected a tension spring 76 for biasing the arm about pivot 74 so as to maintain the pinion in frictional engagement with the rim of the turntable drive wheel.

If the peripheries of the pinion and the turntable drive wheel are exactly circular and are exactly concentric to their respective axes, the axis of rotation of the motor rotor will be fixed relative to axis 36 during operation of the phonograph. In actual practice, however, both these conditions are difficult to obtain unless costly manufacturing procedures are observed; very close obtention of these conditions is possible without the use of costly manufacturing techniques. Because the axis of motor 66 floats, i.e., is not fixed, relative to the turntable shaft, the pinion and drive wheel can be fabricated by low cost techniques. The resilient biasing of the pinion into engagement with the drive wheel provides the necessary traction of the pinion against the drive wheel, yet permits the pinion to move laterally against the bias of spring 76 to accommodate any eccentricity in the pinion or the drive wheel. As a result, the loadings upon the bearings for the drive wheel and the motor rotor are essentially constant, and this means that the wear on these bearings is minimized. If the axis of the motor shaft were fixed relative to axis 36, any eccentricity in the pinion or the drive wheel would impose cyclic loads on the motor and drive wheel bearings, and the bearings would wear more rapidly than if such cyclic loadings were avoided. Bearing wear produces a corresponding decline in the ability of the mechanism to rotate the turntable with no or negligible wow. The wow of phonograph 20 is very low, and the floating nature of pinion 63 is significant in maintaining the wow characteristic of the phonograph at a low level. The structure described assures that the rate of clockwise rotation of the turntable is always at the desired speed.

In phonograph 20, chassis plate 30 functions as a part of motor 66 in that it provides a part of the magnetic flux path in the motor. Also, the construction described above contributes to the simplicity and light weight of the phonograph.

The power for operating the motor is provided by a bank of rechargeable batteries 77 (see FIG. 16A) located in the phonograph housing. The speed of rotation of the motor rotor is regulated by a motor servo control unit 78, described in more detail below.

Figure 10:
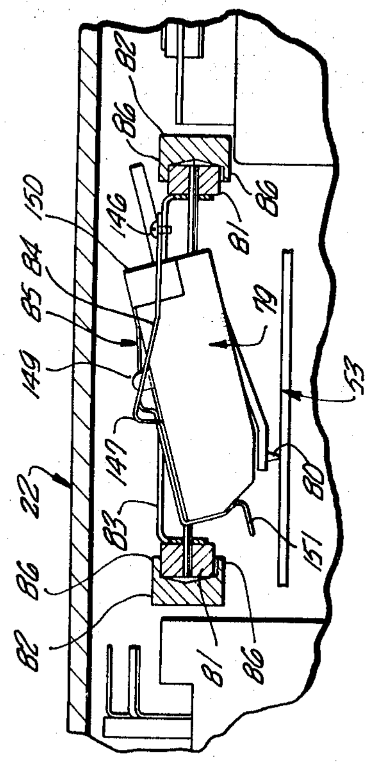
FIG. 10 is an enlarged cross-section elevation view taken along line 10—10 of FIG. 2 through a cartridge carriage and support track.

A stylus cartridge 79, carrying a stylus 80, is mounted in housing 21 above turntable 35 for engagement with a record clamped between the turntable and the clamping disc when the turntable is at the upper one of two spaced limits of travel of the turntable along its axis of rotation. As shown in FIGS. 1, 2, and 10, the cartridge is supported on rollers 81 between two parallel track members 82 which extend generally normal to the length of support bracket 46 parallel to the plane of rotation of the turntable. The rollers extend from opposite ends of a cartridge carriage 83 to which the cartridge is mounted by a support spring 84 and a mounting clip 85. The rollers cooperate between a pair of parallel flanges 86 which extend laterally from each track member toward the other track member. The flanges are spaced apart a distance only slightly greater than the diameter of the rollers. The track members are mounted to lug member 52 above the clamp disc, as shown in FIGS. 1 and 2, and to a bracket 87 secured to the chassis plate radially of the turntable. The stylus engages a record on a line radially of axis 36 and moves linearly along such line during playing of the record. The engagement of the stylus with a record is relied upon to drive the carriage along the track members into engagement with a depending finger 88 of an elongate cartridge return lever 89 mounted on a reversing switch camshaft 90 at the rear of the housing.

Figures 4, 7:
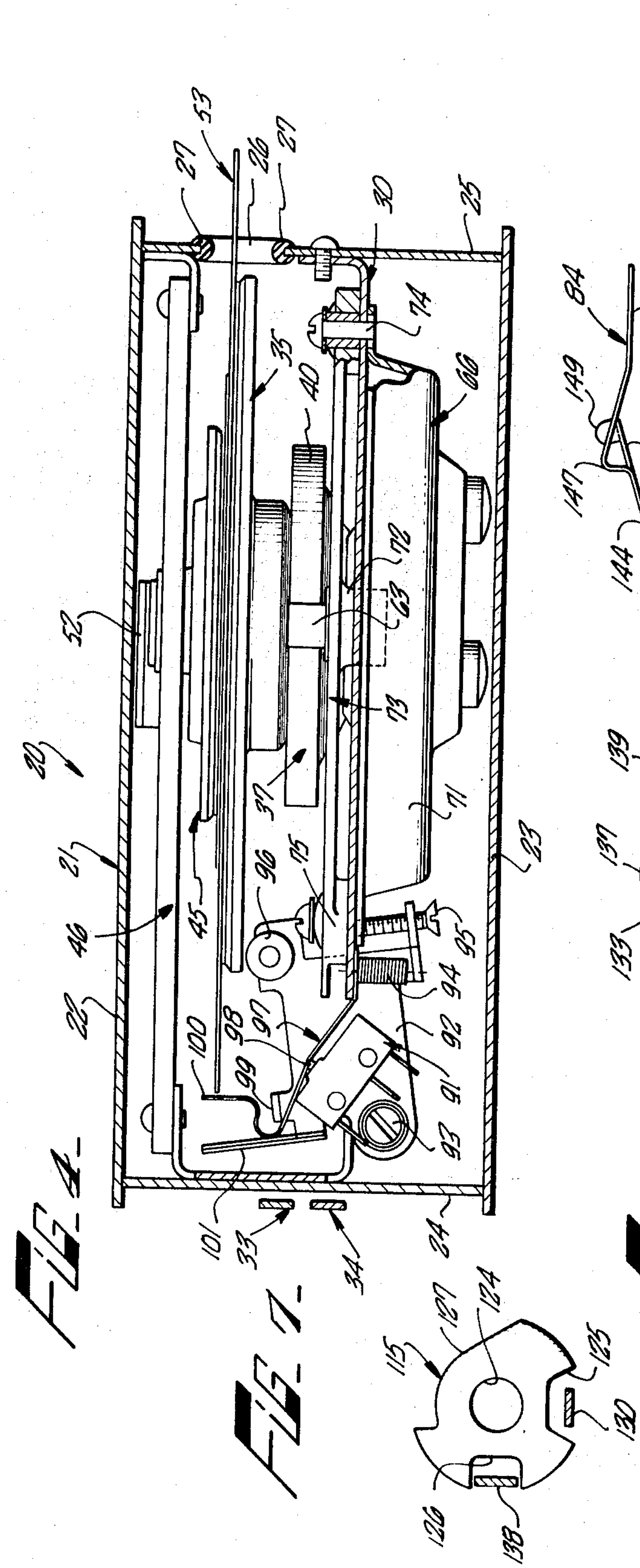
FIG. 4 is a cross-sectional elevation view taken along line 4—4 of FIG. 2.
FIG. 7 is a plan view of a reversing switch control cam.

As shown in FIGS. 3 and 4, a normally-open DPDT phonograph start microswitch 91 is secured to a start switch mounting bracket 92 which is pivoted at 93 at the rear of the housing. The switch bracket can rotate in a plane normal to the turntable about an axis parallel to the housing back plate; this plane is located parallel to and just to the right of a plane radially of the turntable and normal to the housing front and back plates. The switch mounting bracket is biased to rotate counterclockwise (see FIG. 4) about its pivot axis by a spring 94 connected between the bracket and the chassis plate. The bracket also carries an adjustment screw 95, engageable with the underside of the chassis plate, for defining the counterclockwise limit of rotation of the bracket about pivot 93. The bracket extends forwardly from the pivot under the turntable and carries a rubber grommet 96 which is frictionally engageable with the underside of the turntable to retard rotation of the turntable during such engagement.

A record positioning and start switch actuating leaf spring 97 is secured to the chassis plate under the rearmost extent of the turntable and extends rearwardly from its mounting past an actuator button 98 of the start switch, and then past an adjacent keeper finger 99 which extends from bracket 92 parallel to the bracket pivot axis. Upwardly of the keeper finger, the leaf spring defines a vertical record sensing finger 100 disposed adjacent the turntable directly rearwardly of the center of record loading slot 26. Bracket 92 also defines an actuating finger 101 which extends into engagement with a cartridge return and reversing switch actuating lever 102 in the mechanism centered around reversing switch camshaft 90.

As shown in FIGS. 16A and 16B, a bank of six 1.25 volt, rechargeable "C" size batteries 77 are located in housing 21. Four of the batteries are mounted to the chassis by means of battery holder units 208, two of which are secured to each one of a pair of battery mounting brackets 209 (see FIG. 2). Each bracket is mounted to the chassis plate adjacent an opening 210 formed in the chassis to accommodate the batteries. Each bracket 209 is generally L-shaped and has an upstanding leg 211 extending from the chassis plate toward housing top plate 22. Each leg has a planar surface 212 which faces toward axis 36, and the shortest distance from each surface to the turntable axis is slightly greater than the radius of a 7-inch record. Brackets 209 are arranged in the housing so that they are symmetrical with respect to a plane radially of the turntable and normal to the housing front plate, and so that surfaces 212 lie at 45° angles to such a plane.

The batteries are connected in series across a pair of common contacts of start switch 91 (FIG. 16A), the switch also having a pair of normally-open contacts and a pair of normally-closed contacts. The start switch normally-open contacts are connected to respective ones of a pair of normally-closed contacts of a reversing switch 103, the common contacts of which are connected across printed-circuit motor 66. The reversing switch also has a pair of normally-open contacts. Servo control unit 78 for the motor is also connected across the reversing switch normally-closed contacts. The reversing switch normally-closed contacts are in circuit when the motor rotates to drive the turntable clockwise.

When the phonograph is not operated and contains no record 53, the turntable is located at its lower limit of travel along its axis of rotation; in this position of the turntable, the lower extremity of turntable boss 43 is close to engagement with the drive wheel circumferentially of the drive wheel hub. In this state of the above-described apparatus, start switch bracket 92, by reason of the engagement of grommet 96 with the underside of the turntable, is moved into its most clockwise position about pivot 93 against the bias of spring 94, keeper finger 99 is disengaged from the start switch actuating leaf spring, and the leaf spring is clear of start switch actuating button 98. Also, the cartridge is at its normal position away from axis 36 along track members 82 and is held in this position by cartridge return lever 89. Assume than that a 7-inch 33-⅓ RPM record, having a small diameter center hole, is inserted into the phonograph through slot 26. As the record is inserted into the phonograph, it is guided into near coaxial relation with the turntable by engagement of its rim with surfaces 212 of battery mounting brackets 209. As the record reaches its proper position in near coaxial alignment with the turntable, the rear extremity of the record engages record sensing finger 100 and deflects spring 97 sufficiently to cause the spring to engage and operate the start switch actuator button, thereby closing the start switch normally-open contacts and turning the phonograph ON. Insertion of the record into the phonograph also operates reverse switch 103 from its "reverse" mode to its "forward" mode, as described below. Motor 66, therefore, is operated to turn the drive wheel clockwise about axis 36. Because of the engagement of grommet 96 with the turntable, the turntable is held from rotation about axis 36. Thus, the rotation of the drive wheel relative to the turntable is effective to drive the turntable upwardly along axis 36 toward record 53 and clamp disc 45, the clamp disc being disposed at its lower limit of travel relative to support bracket 46 by virtue of the bias of spring washer 142. The start switch bracket moves counterclockwise about pivot 93 (such movement moving the cartridge return lever to the position shown in FIG. 2 via finger 101), under the urging of spring 94 as the turntable moves upwardly, until such movement of the bracket is terminated by engagement of adjustment screw 95 with the chassis plate as shown in FIG. 4. By this time, however, the start switch bracket has moved sufficiently to cause keeper finger 99 to engage spring 97 so as to hold the spring against the switch actuator button and maintain the switch in an ON condition. Also, before screw 95 engages the chassis, record 53, being held by spindle ring 55 above a circular traction pad 104 (FIG. 1) disposed just inwardly of the rim of the turntable on the upper surface of the turntable (the pad preferably is made of sponge elastomeric material), is moved into engagement with a clamp disc traction pad 105 secured to the underside of the clamp disc about axis 36. Pad 105 is also preferably made of sponge elastomeric material. The engagement of the record with the clamp disc places a load upon the turntable such that the turntable begins to rotate clockwise with the drive wheel, but at a rate slower than the drive wheel due to the frictional contact between the turntable and the grommet. Accordingly, the turntable continues to be driven upwardly along its axis. The load of the clamp disc on the record is sufficient to overcome the bias of spindle ring spring 56, and the spindle ring is driven downwardly into turntable recess 44. (If record 53 has a large center hole, the spindle ring is not depressed and functions as a spindle for the record.) Thus, spindle projection 58 is engaged in the record center hole and is effective to position the record concentric to the turntable axis. At this time, the record also engages the turntable traction pad and begins to rotate clockwise with the turntable. The record is also moved into initial contact with stylus 80 of the cartridge assembly. Continued rotation of the drive wheel moves the turntable upwardly until the flange 207 on externally threaded sleeve 41 prevents any further upward movement of the turntable along axis 36. By the time the turntable reaches its upper limit of travel, it is rotating at a rate equal to the rate of the drive wheel since grommet 96 has been disengaged from the turntable by reason of engagement between adjustment screw 95 and the chassis. Once the turntable reaches its upper limit, it can move only rotatively, and its rotational rate is matched to that of the drive wheel, i.e., 33-⅓ RPM. The last increment of movement of the record upwardly along axis 36 moves the cartridge against the bias of its supporting spring to impose the proper record tracking force upon the stylus.

When the turntable is at its upper limit of axial movement, as shown in FIG. 1, and a record is clamped between it and the clamp disc, the phonograph is attitude insensitive. The record is maintained in a plane normal to axis 36 regardless of the position of the phonograph housing. Also, the stylus cartridge can move only radially of the record, and such movement of the cartridge is regulated by the record grooves themselves, regardless of the attitude of the phonograph. Further, the phonograph is relatively insensitive to accelerations except accelerations applied to the housing along a line parallel to cartridge track members 82; accelerations along such a line, if of a relatively high magnitude, would tend to move drive pinion 63 out of contact with the drive wheel, and they would also tend to move the stylus out of the record groove.

A transistorized stereophonic amplifier 106 (FIGS. 1 and 16B) is located in the phonograph housing for receiving output signals from cartridge 79 and for driving a loudspeaker 107 mounted in the housing adjacent a grille in the housing bottom plate. The amplifier is connected to a volume/tone control 108 operated by concentric tone and volume knobs 109 and 110, respectively, disposed on the exterior of the housing adjacent slot 26 as shown in FIG. 13. As represented in FIG. 16B, the volume/tone control includes simultaneously operated left and right channel tone control potentiometers 111 and 112, respectively, and simultaneously operated left and right channel volume control potentiometers 113 and 114 respectively. Power for driving the amplifier is obtained from the batteries across the normally open contacts of the starts switch.

As noted above, the phonograph includes a DPDT reversing switch 103 which is effective upon operation from its normal "forward" mode to its "reverse" mode, to cause the motor to be driven so as to rotate the drive wheel counterclockwise. The reversing switch is operated by a reversing switch control cam 115 (FIG. 3) mounted on camshaft 90, the rotation of the cam to cause the reverse switch to be operated from its "forward" to its "reverse" mode being accomplished in response to movement of cartridge return lever 89. The cartridge return lever is operated by movement of the cartridge assembly toward the turntable axis, from the position of the cartridge return lever shown in FIG. 2, following engagement of the cartridge assembly with depending finger 88 of the cartridge return lever.

The reversing switch is mounted to the upper rear end of the reject lever 116 (FIG. 2) which is pivoted at 117 to the chassis plate just forwardly of the reversing switch. The reject lever extends forwardly from its pivot under the turntable and through a slot 118 (FIG. 13) in the front plate to a front end which carries a knob 119. The front end of the reject lever is biased to the right end of slot 118 by a spring 120 connected in the housing between the reject lever and the chassis plate. The reversing switch includes a pair of rollers 121 (FIG. 2) mounted on actuating leaf springs and engaged with cam 115.

Figure 9:
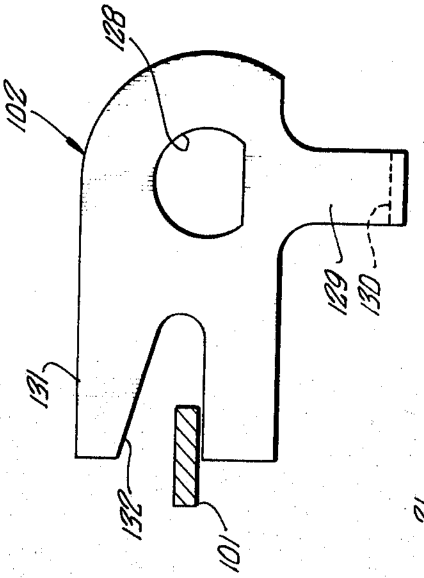
FIG. 9 is an enlarged plan view of a cartridge return and reversing switch actuating lever.
Figure 8:
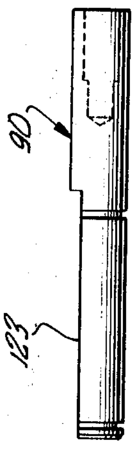
FIG. 8 is an elevation view of a reversing switch camshaft.

Cam 115 and shaft 90 form a part of a toggle mechanism which also includes actuating lever 102, shown in FIGS. 3 and 9. Shaft 90, shown in detail in FIG. 8, is rotatably mounted at its opposite ends (see FIG. 3) between the chassis plate and a forwardly extending flange 122 defined by the chassis plate adjacent the intersection of the housing rear and top plates; the rear end of support bracket 46 is also mounted to the flange. The lower portion of shaft 90, around which the cam is disposed for rotation relative to the shaft, defines a segmental keyway 123 with which lever 102 is engaged above the cam so as to be secure from rotation relative to the shaft.

The cam (FIG. 7) has a generally circular cylinder profile and has a substantially axial bore 124 in which the lower portion of the camshaft is disposed. The profile of the cam defines a first longitudinal notch 125 along the length of the cam; the notch is relatively wide circumferentially of the cam. The cam also has a second longitudinal notch 126 in its periphery; this notch is displaced about 90° from notch 125 angularly of bore 124. Further, the cam has a radially inwardly relieved fall portion 127 extending from opposite notch 126 to opposite notch 125, as shown in FIG. 7.

Actuating lever 102 (FIG. 9) has an aperture 128 formed through it for mating with the cross-sectional configuration of the shaft at keyway 123. A lug 129 extends radially of aperture 128 and terminates in a depending finger 130 which has a width transversely of the lug substantially less than the width of cam notch 125 in which the finger is engaged when the operating lever is mounted to the shaft. The operating lever also has a lateral extension 131, oriented 90° from lug 129 relative to the aperture, in which is formed a V-shaped notch 132. Finger 101 of the start switch bracket is received in notch 132 (see FIG. 3).

Figure 5:
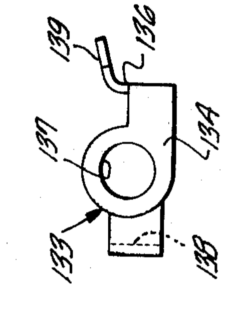
FIG. 5 is a top plan view of a drive reversing switch lever.
Figure 6:
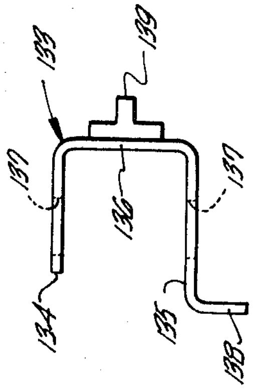
FIG. 6 is an elevation view of the lever shown in FIG. 5.

A reversing switch lever 133 (shown in detail in FIGS. 5 and 6) is rotatably mounted on the cam shaft above the cam as shown in FIG. 3. Lever 133 has a pair of parallel legs 134 and 135 which extend laterally from a body 136 of the lever and which define coaxially aligned apertures 137 through which the shaft is passed. The lever leg adjacent the cam (leg 135) defines a depending finger 138 which is engaged in cam notch 126 with little clearance (about 0.01 inch) relative to the sides of the notch. The body of lever 133 defines a lug 139 which is engaged in one end of a compression toggle spring 140. The other end of the toggle spring is engaged with a toggle spring support member 141 (FIG. 2) fixed relative to the housing. The spring is positioned to urge the reversing switch lever clockwise about shaft 90 when the lever is in the position shown in FIG. 2, and to urge the lever counterclockwise about the shaft when lug 139 is moved rearwardly of a line between the axis of the shaft and the spring support member. The reversing switch lever is mounted on shaft 90 so that body portion 136 lies rearwardly of record loading slot 26. In its most clockwise position relative to the shaft (see FIG. 2), the lever is positioned so that the forward edge of its body portion is engaged by a record inserted into the phonograph.

Consider the phonograph just after the playing of a record has commenced. The cartridge return lever is positioned a short distance toward the cartridge from the inner limit of cartridge movement along track members 82, as shown in FIG. 2. Cam 115 is positioned so that reversing switch rollers 121 engage the cam between notch 125 and fall portion 127; the reversing switch is then in its "forward" mode. Reversing switch lever 133 is positioned so that toggle spring 140 urges the lever counterclockwise about the camshaft. Finger 130 of the actuating lever is located close to the end of cam notch 125 adjacent notch 126, and the rear face of start switch bracket finger 101 is engaged with the actuating lever in notch 132.

As the cartridge is moved toward the turntable axis in response to tracking of the stylus in the record groove during playing of the record, the cartridge engages finger 88 of the cartridge return lever. Continued movement of the cartridge toward the turntable axis causes the return lever to rotate clockwise and to rotate shaft 90 in the same direction. After slight movement of the shaft, actuating lever finger 130 engages the cam and begins to drive the cam and reversing switch lever 133 clockwise against the bias of toggle spring 140. The lever arm provided by the cartridge return lever is large, and thus the stylus tracking force is sufficient, at the end of such arm, to overcome the bias of the toggle spring. As the stylus reaches the "run out" portion of the record groove, the camshaft is rotated sufficiently to drive lug 139 over-center of a line between the shaft axis and the toggle spring support member, thereby causing the reversing switch lever to toggle into a position in which the spring urges the lever clockwise about the shaft; the cam follows this toggle action by virtue of the engagement of finger 138 with cam notch 126. This action also moves the actuating lever into contact with the front face of start switch bracket finger 101.

During the occurrence of the above-described toggle action, the reversing switch rollers are placed adjacent the cam fall portion to place the reversing switch in its "reverse" mode, and the energization of motor 66 is reversed. Drive wheel 37 is then driven counterclockwise to cause the turntable to lower to disengage the record from stylus 80 and ultimately to release the record from between the turntable and the clamp disc. As the turntable is lowered, the start switch bracket is rotated clockwise about pivot 93 (FIG. 4), and this motion is reflected as counterclockwise rotation of shaft 90 via finger 101 and actuating lever 102. The counterclockwise rotation of the shaft occurs after the record drops from contact with the stylus. This rotation of shaft 90 is imparted to the cartridge return lever and is sufficient to drive the cartridge to its limit of travel remote from axis 36 where it is held by the cartridge return lever until another record is loaded into the phonograph. At the time the cartridge is moved to its position away from the turntable, finger 130 of actuating lever 102 is engaged with the right edge of cam slot 125. Also, at this time, the start switch bracket moves to free spring 97 from button 98 so that motor 66 is turned OFF. Thus, when the phonograph contains no record, the reversing switch is in its "reverse" mode.

The insertion into the phonograph of another record is relied upon to open the reversing switch into its "forward" mode before motor 66 is energized. As noted above, the body of reversing switch lever 133 extends sufficiently toward axis 33 (when the lever is in its most clockwise or "reverse" position relative to shaft 90) to interfere with a record, were a record present in the phonograph in coaxial alignment with axis 36. Accordingly, as a record in inserted into the phonograph, the rear edge of the record engages body 136 of lever 133 before it engages spring finger 100. Insertion of the record into the phonograph so that the record engages record locating surfaces 212 of battery mounting brackets 209 causes the record to engage lever 133 sufficiently to cause the lever to toggle over-center in a counterclockwise direction and to operate the reverse switch into its "forward" mode via cam 115. Thus, the reverse switch is reset for "forward" mode operation of the phonograph as a record is inserted.

At the time lever 133 toggles over-center counterclockwise about shaft 90 in response to the insertion of a record into the phonograph, the cam rotates to move the left edge of cam notch 125 into contact with actuating lever finger 130, but the finger and the cartridge return levers do not move. As the start switch bracket moves upwardly about pivot 93 (as described above), finger 101 ultimately, by reason of its engagement with lever 102, drives the cam and lever 102 clockwise, thereby moving the cartridge return lever clear of the cartridge before the record engages the stylus sufficiently to cause the stylus to track. The clockwise rotation of the cam is insufficient to cause the reversing switch lever to toggle over-center in a clockwise direction. The mechanism is then returned to the state first considered above.

When the rotation of drive wheel 37 is reversed from clockwise to counterclockwise at the end of play of record 53, the lock of the clamp disc from counterclockwise rotation is imparted to the turntable via traction pads 104 and 105 and the record. Thus, the drive wheel is rotated counterclockwise relative to the turntable and the turntable is driven downwardly along axis 36. Spring washer 142 causes the clamp disc to follow the initial downward movement of the turntable until collar 51, carried by the disc hub, engages the upper side of support bracket 46 around aperture 50, thereby disengaging a record from stylus 80. Continued counterclockwise rotation of the drive wheel tends to move the turntable into engagement with the drive wheel, but the phonograph is turned OFF before such engagement occurs.

Figure 12:
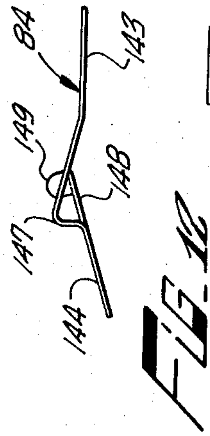
FIG. 12 is an enlarged side elevation view of the cartridge support spring shown in FIG. 11.
Figure 11:
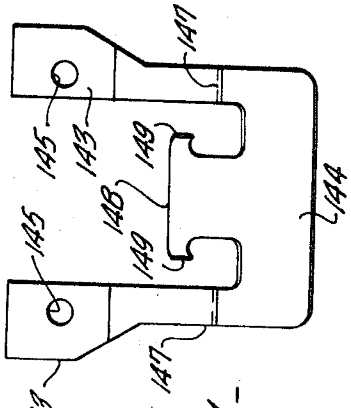
FIG. 11 is an enlarged top plan view of a cartridge support spring.

It was mentioned above that stylus cartridge 79 is secured to its carriage 83 by a spring 84 illustrated in detail in FIGS. 10 and 11. The cartridge support spring is of generally U-shaped planform configuration and has a pair of parallel legs 143 and a base portion 144 interconnecting the legs. The spring is made of sheet spring steel. An aperture 145 is formed through each leg opposite from the base of the spring for connection of the spring to the cartridge carriage by means of screws 146 (see FIG. 10). Between the cantilevered ends of the legs and the base of the spring, the legs, as shown in FIG. 12, form a knuckle 147 which is configured so that the base of the spring lies at an angle to the apertured terminal portions of the legs. The knuckles are provided to increase the compliance of the spring and to assure that the spring base portion lies in the proper plane relative to the cartridge, thereby to impose the proper attitude upon cartridge 79, as shown in FIG. 10. Intermediate the legs, the base of the spring defines a projection 148 coplanar with the base. At the lateral edges of the projection opposite from the base, the projection defines a pair of upwardly turned lugs 149. The lugs cooperate with cartridge retainer clip 85 to assure that the retainer clip is properly positioned over the base of the support spring relative to the cartridge.

Preferably, the stylus cartridge utilized in a phonograph according to this invention is a Euphonics U—88 cartridge. Such a cartridge conventionally is marketed with a retainer clip like retainer clip 85 illustrated in the accompanying drawings. As shown in FIG. 10, the clip is adapted to overlie the upper surface of the cartridge and has a pair of legs 150 which are engaged with the upper rear corners of the cartridge. The clip also defines a suitably configured lug 151 which is engaged over the front end of the cartridge centrally of the width of the cartridge.

To mount the cartridge to the carriage, the cartridge is placed against the underside of the support spring so that the edge of the spring base opposite from the legs is aligned with the front end of the cartridge. The retainer clip is then placed over the cartridge support spring and snapped into place around the cartridge. The support spring lugs 149 properly positioned the cartridge and the retainer clip relative to the support spring. The cartridge is thus mounted in cantilever fashion within a central aperture of the cartridge carriage. Accordingly, as record 53 is moved upwardly into contact with the stylus, the legs of the cartridge support spring deflect to impose the proper tracking force on the interface between the stylus and the record groove.

Phonograph carrying handle 32 is of generally U-shaped configuration and has parallel legs 152, the opposing surfaces of which are spaced apart a distance slightly greater than the exterior width of housing 21 (see FIG. 2). The handle is secured to the housing by a stud 153 which extends inwardly from each handle leg adjacent the end of the leg. The studs enter the housing through slots 154 formed along the abutted edges of top and bottom plate flanges 28 and 29 and through the mounting flanges of the chassis plate. In the housing, each stud is connected to one end of a tension spring 155, the opposite end of which is connected to the chassis plate. The springs are arranged in the housing to urge the studs toward the rear of the phonograph housing.

As shown in FIG 14, the ends of handle legs 152 are cut off square and normally, in the phonograph carrying position of the handle, abut the forward ends of shrouds 156 for support legs 34. When the ends of the handle legs are abutted against the forward ends of the support leg shrouds, studs 153 are positioned at approximately the midlengths of slots 154, as shown in FIG. 2. The normal position of the handle is that show in FIG. 14 wherein the central grip portion of the handle is disposed in spaced parallel relation to the central portion of the front of housing 21.

As best shown in FIG. 1, the support leg shrouds are of channel-like cross-sectional configuration. The shrouds extend from adjacent the rear ends of slots 154 to just rearwardly of the exterior surface of housing rear plate 24. The shrouds are mounted to the housing to define a chamber 157 interiorly of the shrouds along the front-to-back dimension of the phonograph housing. Support legs 33 and 34 are of generally U-shaped configuration and have parallel arms 158, each of which has a longitudinal slot 159 formed through it along the major portion of the arm (see FIG. 14). The support leg arms normally are disposed within chamber 157 so that the arms of support leg 33 overlie the arms of support leg 34. The arms are retained relative to the housing by a pair of screws 160, one screw being passed through each chamber 157 adjacent the rear end of the phonograph housing as shown in FIG. 2. When the legs are fully retracted into their enclosing chamber, the portions of the support legs which interconnect arms 158 lie parallel to each other just to the rear of the exterior surface of the housing back plate and forwardly of the rear edges of the housing top and bottom plate (see FIG. 4).

Adjacent the rear of the housing, flanges of the support leg shroud members are cut away (see FIG. 14). Accordingly, the support legs may be withdrawn from chamber 157 until the sliding movement of the legs relative to the phonograph is limited by engagement of slots 159 with screws 160. The legs may then be spread apart, as shown in FIG. 4, to provide the foundation by which the phonograph may be stood upright on a table or the like. The ends of the arm 158 which are retained in shrouds 156 are relieved diagonally of the arms to provide triangular stops 160′ for cooperation with the inner surfaces of the shroud flanges for limiting the angular motion of the legs relative to screws 160 in the extracted positions of the legs. As a result, the foundation provided by the legs is stable and the phonograph cannot pivot relative to the legs about screws 160.

Figure 15:
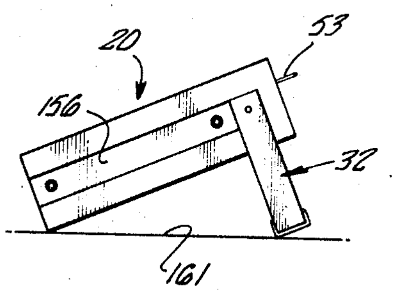
FIG. 15 is a side elevation view of the phonograph disposed to use a supporting surface as an acoustical sounding board.

During use of the phonograph to play a record 53, particularly when the playing mode of the phonograph is monaural rather than stereophonic, it is advantageous to use carrying handle 32 as a support for positioning the phonograph relative to a table 161 (see FIG. 15) so that the table may be used as a sounding board. To accomplish this, the support handle is pulled away from the phonograph housing until studs 153 engage the forward ends of slots 154. The handle is then rotated 90° relative to the housing so that the handle extends away from that side of the housing to which loudspeaker 107 opens. The handle is then released so that springs 155 are effective to urge the sides of the handle legs into abutment with the forward ends of shroud members 156. The tension in the springs is sufficient to maintain the handle in this position. As a result, the phonograph may be supported by the central grip portion of the handle at an angle on the table so that sound, particularly sound of base and intermediate frequencies, is enhanced by reason of the table surface functioning as an acoustical sounding board.

Referring to FIGS. 16A and 16B, the negative end of the series-connected array of batteries 77 is connected to one of the common terminals of start switch 91. The positive end of the battery array is connected to the other common terminal of the start switch via a diode 162 and a resistor 163 (preferably an 8.2 ohm, 0.5 watt resistor) coupled in parallel with the diode. The diode is arranged to block current flowing toward the positive end of the battery array. The common connection between diode 162, resistor 163, and switch 91 is connected to a positive terminal 164 of a female connector part 165 for a suitable external power supply cord; a resistor 166 (preferably a 3.3 ohm, 10 watt resistor) and a diode 167 are disposed in series in this connection. Diode 167 is arranged to pass current from terminal 164 to the positive end of the battery array. Connector part 165 also includes a common terminal 168 connected via a resistor 169 (preferably a 6.8 ohm, 10-watt resistor) to the normally closed start switch contact which is associated with the positive common terminal of the switch. The connector also includes a negative terminal 171 connected directly to the negative common contact of the start switch.

In order that phonograph 20 may be operated from an external power source, rather than from battery array 77, or so that the phonograph batteries may be recharged, a 115 volt A.C. power cord 172 is provided with the phonograph. One end of the power cord is connected to a male connector part 173 adapted to mate with connector part 165. The one of the two conductors of the power cord which is connected to terminal 164 during use of the cord is defined by 85 ohm resistance wire. The other two of the three terminals of connector part 173 are interconnected as illustrated in FIG. 16A; this interconnection is effective to provide a circuit between terminals 168 and 171 when the power cord is utilized to supply external power to the phonograph and permits impedance 169 to be effective during charging of batteries 77, but effectively removes this impedance from the phonograph circuitry when the power cord is disconnected from the phonograph. In view of the above-described connection of impedance 169 to the start switch, the impedance is effectively removed from the circuitry of the phonograph when the phonograph is playing. However, when the phonograph is not playing and an external power source is utilized to recharge batteries 77, this impedance simulates the system load of the amplifier and drive motor servo-control unit and draws about 1 amp current.

Diode 167 is provided for rectifying A.C. voltage applied to the phonograph via power cord 172, the voltage applied across terminals 164 and 171 being about 12 volts in view of the impedance of the power cord. Impedance 166 serves a voltage-dropping function so that the voltage present at the common connection between this impedance and impedance 163 is about 7.5 volts. Diode 162 is provided to limit the recharging current applied to batteries 77, but is fully conductive during the playing mode of the phonograph.

As illustrated in FIG. 16A, phonograph 20 is also provided with a 12 volt D.C. power cord 174; this cord is provided with a male connector part 175, substantially identical to connector part 173. The opposite end of the power cord is provided with a connector by which the cord can be connected to an automobile cigar lighter or the like, thereby adapting the phonograph for playing or recharging from a 12 volt automobile ignition system. As is the case with power cord 172, two of the three terminals of connector part 175 are interconnected to provide a circuit between terminals 168 and 171 during use of cord 174.

Servo-control unit 78 for motor 66 is mounted to the chassis via a connector 176. Preferably, the servo-control unit is a removable module in the phonograph. The servo-control unit includes a photocell 177 and a lamp 178 which are mounted on opposite sides of motor rotor 67 adjacent the periphery of the rotor. As noted above, the motor is a printed circuit motor. Such motors have conductors laid over the opposite faces of a nonconductive rotor element, these conductors being interconnected at the periphery of the rotor. The interconnections of the rotor conductors define short radially extending spikes circumferentially of the rotor. This characteristic of printed circuit motors is relied upon to provide a highly accurate, lightweight motor speed control mechanism in phonograph 20.

Typically, the servo-control unit includes a capacitative oscillator which produces pulses at a desired frequency to signal the motor to turn on. Each pulse causes the motor to produce a rotor driving flux pulse across the gap of annular magnet 70. The motor then rotates until a "motor-off" or rotor braking pulse is produced in the form of a counter or back EMF across the magnet gap. The off pulse is produced in response to a pulse generated by the photocell. The photocell scans the peripheral conductor spikes around the rim of the motor rotor. Thus, the motor signal is in the form of a substantially square wave in which the up-going excursion of each wave is a motor-on signal from the servo-control unit oscillator and the down-going excursion of each wave is a motor-off signal derived from the photocell. In the interval between on and off signals, the motor is driven in the desired direction. In the interval between off and on signals, the motor is braked from such rotation. This operation of the motor occurs rapidly since there are about 239 conductors around the periphery of the motor and since the rotor rotates at a considerably higher velocity than drive wheel 37 in view of the relative diameters of pinion 63 and the drive wheel. In effect, the motor rotor can be considered to step short increments angularly of its axis, but the stepping of the rotor occurs at such a high frequency that no discernible effect is produced in the sound emanating from loudspeaker 107. It is apparent, therefore, that no flywheel per se is relied upon in a phonograph according to this invention. Rather, the phonograph relies upon a phase-lock system to produce an electronic flywheel effect for accurate rotation of the phonograph turntable.

The motor drive system described above is preferred to a silicon controlled rectifier feedback-type motor energization system since the current levels associated with the above-described servo-control unit are lower than in an SCR-type circuit. Accordingly, the current drain on batteries 77 is held to a minimum, thereby prolonging the useful life of the batteries.

The servo-control unit is not used to control operation of the motor during reverse mode operation of the motor so that the reject or record release operation may be performed as rapidly as possible.

In order that the phonograph may be used for playing either 45 or 33-⅓ rpm records, a single-pole double-throw speed selector switch 179 is mounted to the phonograph housing front plate, as shown in FIG. 13. In connection with the speed selector switch, the phonograph includes a pair of speed trimming potentiometers 180 and 181 which are provided for trimming the R aspect of the RC oscillator within the servo-control unit for 45 rpm and 33-⅓ rpm modes of operation of the phonograph.

In order to regulate the stability of motor operation when the phonograph is in a play mode, a damping potentiometer 182 is connected between the servo-control unit and one of the normally open contacts of reversing switch 103. The damping potentiometer is provided for adjusting the gain of the servo-control unit to correct for physical changes (such as increased friction in the turntable bearings because of dirt in the mechanism) in the phonograph mechanism. Access to the damping potentiometer is had through an access hole 183 formed in the back plate of the phonograph housing (see FIG. 3).

The audio portion of the circuitry of the phonograph is illustrated in FIG. 16B. Stereo amplifier 106 preferably is a transistorized, modularized unit which is connected into the circuitry of the phonograph via a connector 184. Signals from the left and right terminals of stereo cartridge 79 are supplied to the amplifier via a connector 185 for a remote loudspeaker unit 186 (described in detail below) and via volume-tone control unit 108. The connector for the remote loudspeaker unit preferably is a ¼-inch phone jack incorporating a single-pole double-throw switch 187, having a normally open contact 188 and a normally closed contact 189. The left channel output terminal of the stereo cartridge is connected to the common element of switch 187 and the right channel terminal of the cartridge is connected to contact 189. In the normal condition of the switch, therefore, the left and right channel signals produced by the stereophonic stylus cartridge are mixed prior to introduction of these signals to the volume-tone control. As a result, even through a stereophonic record may be played in the phonograph, the sound produced by loudspeaker 107 is essentially monophonic sound when the remote speaker unit is not is use.

An earphone jack 190 incorporating a single-pole single-throw switch 191 is connected in parallel with loudspeaker 107, as shown in FIG. 16B. The earphone jack is accessible through the front of the phonograph as shown in FIG. 13. When a conventional earphone plug 192, provided as a part of an earphone assembly 193, is engaged with the earphone jack, switch 191 is opened to effectively disconnect loudspeaker 107 from the amplifier.

Remote loudspeaker unit 186 is provided with a suitable length of three-conductor cable 194 to which is connected a jack 195 configured for cooperation with phone jack 185. The remote loudspeaker unit is provided for reproducing left channel sound derived from stereophonic cartridge 79. When jack 195 is engaged with connector 185, switch 187 is operated to place the switch in a condition whereby no mixing is obtained of the signals derived from the left and right channel terminals of the stylus cartridge. Instead, when the remote speaker unit is in use, the left and right channel signals from the cartridge are applied separately to the respective channels of the amplifier via volume-tone control 108. During stereophonic operation of the phonograph, loudspeaker 107 serves as the right channel loudspeaker, whereas a loudspeaker 196 in the remote speaker unit serves as the left channel speaker. The speaker within phonograph housing 21 is selected as the right channel loudspeaker in view of the practices which have been established as standard in the manufacture of stereophonic records.

It is now standard practice in the phonograph recording industry to record a full audio spectrum in the right channel, i.e., on the right side of a phonograph record groove, and to record only the upper portion of the audio spectrum in the left channel, i.e., left side, of the record groove. In other words, a truly stereophonic effect is maintained only with respect to intermediate and high audio frequencies, but not with respect to bass frequencies. This is done because the human ear is relatively insensitive to the directionality of base sounds, whereas it is highly sensitive to the directionality of treble and mid-range sounds.

It is desired that remote speaker unit 186 be provided as a relatively low cost accessory to phonograph 20. Accordingly, the loudspeaker within the phonograph itself is selected as the right channel speaker since this loudspeaker can realistically be more costly than loudspeaker 196, and thus be better suited for reproduction of a full audio spectrum.

Remote speaker unit 186, shown in FIG. 17, has a housing 197 having front-to-back and transverse dimensions substantially equal to the corresponding dimensions of phonograph housing 21 so that it is generally of similar size and shape to housing 21. The remote speaker housing has a top surface 198 defining a grille 199 below which remote speaker 196 is mounted, the speaker preferably being an oval speaker mounted adjacent one end of the housing. A generally tubular extrusion 200 of low thermal conductivity material, such as vinyl plastic having a coefficient of thermal expansion similar to that of the material from which phonograph records are made, is located in the housing laterally of the loudspeaker and defines an elongate record storage chamber 201 extending between the front and the rear of the housing. The transverse dimension of the chamber is slightly greater than 7 inches. A hinged door 202, extending across the chamber, forms a part of the housing and is secured in closed relation to the housing by a thumbscrew 203. The chamber serves as a storage compartment for a quantity of 7-inch records; earphones and other accessories can be stored between the extrusion and the housing. Because of the nature of the material from which the extrusion is made, the extrusion and any records in chamber 201 expand at the same rate in response to temperature changes, and any thermally induced warpage of the record is minimized.

A laterally extended hook projection 204 extends from the front edge of the bottom of housing 197 (see FIG. 18). A leaf spring 205 is riveted to the back of the housing and extends beyond the bottom of the housing into a hook portion 206. The hook projection may be engaged over the front edge of the top plate of the phonograph housing, and the hook portion of spring 205 may be engaged over the rear edge of top plate 22 (see FIG. 18) so that both units can be carried together by means of handle 32. The spring loading of hook 206 maintains the speaker unit in engagement with the phonograph until the two units are intentionally separated.

When stereophonic operation of phonograph 20 is desired, the remote speaker unit is coupled to the phonograph via extension cord 194. Insertion of jack 195 into phone jack 185 separates the right and left channel signals from cartridge 79 and causes these signals to be applied to corresponding channels of amplifier 106.

The amplifier of phonograph 20 may be used, if desired, to drive two remote loudspeakers other than the remote speaker unit described. In such a case, the right channel loudspeaker is provided with a jack suitable for engagement in receptacle 190, and the left channel loudspeaker is provided with a jack suitable for engagement in receptacle 185.

There has been described above a versatile, portable, attitude insensitive record player. The record player may be operated from batteries contained within it, or it can be powered from a 115 volt A.C. power source or from an automobile ignition system. Also, either external power source can be used for the purpose of recharging the batteries contained within the phonograph housing. Only a single motor is used for rotating, clamping and rejecting a record inserted into the player. The record drive mechanism features a motor arrangement which is low in mass and mechanical inertia, yet precise control over the rotational rate of the record turntable is assured. Multiple uses are had of many elements of the record player structure so as to provide a simple, rugged and efficient product.

While specific arrangements and structures have been described in the foregoing description of a presently preferred embodiment of the invention, this has been by way of example and illustration rather than limitation. Accordingly, the foregoing description is not be regarded as limiting the scope of this invention.

What is claimed is:

1. A record player comprising a record turntable having an axis of rotation about which the turntable is rotatable and along which the turntable is movable, stop means defining a limit of movement of the turntable along said axis, turntable drive means including a single reversible motor for moving the turntable along its axis toward and away from said limit and for rotating the turntable at a selected angular velocity when the turntable is at said limit and constrained from movement along its axis, a rotatable record clamp disc disposed coaxially of the turntable engageable substantially at said limit of turntable axial movement with a record supported on the turntable for clamping the record to the turntable, and means mounting the clamp disc for rotation about said axis in a selected direction corresponding to record playing rotation of the turntable, for limited movement along the axis toward and away from the turntable, and for constraining the clamp disc from rotation about the axis in the opposite direction.

2. A record player according to claim 1 including resilient means for biasing the clamp disc along the axis toward the turntable.

3. A record player according to claim 1 including a rotatable drive wheel disposed coaxially of the turntable and coupled thereto, the drive wheel having a circular rim of predetermined circumferential extent, and a drive pinion coupled to the motor and frictionally engaged with the drive wheel rim for rotating the drive wheel in response to operation of the motor.

4. A record player according to claim 3 including means mounting the motor and the drive pinion for movement toward and away from the turntable axis, and means for biasing the motor and the pinion toward the turntable axis for engagement of the pinion with the drive wheel.

5. A record player according to claim 3 including a housing having a chassis, the turntable axis being fixed relative to the housing, wherein the motor includes a rotor, the motor mounting means includes a lever mounting the rotor thereto for rotation about an axis parallel to the turntable axis, the lever being pivoted to the chassis at a location spaced from the rotor for angular movement of the lever relative to the chassis about an axis parallel to the rotor and turntable axes.

6. A record player according to claim 5 wherein the motor and pinion biasing means comprises a spring coupled between the lever and the chassis.

7. A record player according to claim 1 including a stylus cartridge mounted for tracking movement radially of the turntable and circuit means for controlling operation of the motor, the circuit means including a motor reversing switch having a forward state corresponding to playing of a record and a reverse state corresponding to rejection of a record, and toggle means arranged for operation in response to alignment of a record substantially coaxially of the turntable to operate the motor in its forward state and for operation in response to movement of the cartridge inwardly of the turntable to operate the reversing switch from its forward state to its reverse state.

8. A record player according to claim 1 including a stylus cartridge mounted for tracking movement inwardly of a record secured between the turntable and the clamp disc in response to engagement of a stylus carried by the cartridge in the groove of such record, such record being rotatable about said axis during said engagement, and means for moving the cartridge from inwardly of the record to outwardly of the record in response to movement of the turntable away from said limit along said axis.

9. A record player according to claim 1 including a stylus mounted for playing engagement with a record disposed on the turntable and movable between a base position away from said axis and an end-of-play position adjacent said axis, and means responsive to arrival of the stylus at its end-of-play position for reversing the drive means.

10. A record player according to claim 9 including means powered by the motor during reverse operation thereof for driving the stylus from its end-of-play position to its base position.

11. A record player comprising a record turntable having an axis of rotation about which the turntable is rotatable and along which the turntable is movable, stop means defining a limit of movement of the turntable along said axis, turntable drive means including a single reversible motor for moving the turntable along its axis toward and away from said limit and for rotating the turntable at a selected angular velocity when the turntable is at said limit and constrained from movement along its axis, the drive means also including a shaft disposed coaxially of the turntable and rotatable about said axis in response to operation of the motor and screw means coupled between the shaft and the turntable, a rotatable record clamp disc disposed coaxially of the turntable engageable substantially at said limit of turntable axial movement with a record supported on the turntable for clamping the record to the turntable, and means effective upon the clamp disc for constraining the clamp disc from rotation about the axis in a direction opposite to a direction corresponding to record playing rotation of the turntable.

12. A record player according to claim 11 wherein the screw means is arranged to be effective, when the shaft rotates relative to the turntable in the selected direction, to drive the turntable along its axis of rotation toward said limit and, when the shaft rotated in opposition to said selected direction relative to the turntable, to drive the turntable along its axis of rotation away from said limit.

13. A record player according to claim 12 including drag means for holding the turntable from angular movement about its axis during the major portion of travel of the turntable along said axis, said major portion of turntable travel being spaced from said limit.

14. A record player comprising a record turntable having an axis of rotation about which the turntable is rotatable and along which the turntable is movable, stop means defining a limit of movement of the turntable is movable, stop means defining a limit of movement of the turntable along said axis, turntable drive means including a single reversible motor for moving the turntable along its axis toward and away from said limit and for rotating the turntable at a selected angular velocity when the turntable is at said limit and constrained from movement along its axis, a rotatable record clamp disc disposed coaxially of the turntable engageable substantially at said limit of turntable axial movement with a record supported on the turntable for clamping the record to the turntable, a stylus cartridge mounted for tracking movement radially of the turntable, circuit means for controlling operation of the motor including a motor reversing switch having a forward state corresponding to playing of a record and a reverse state corresponding to rejection of a record, toggle means for operating the reversing switch between said states, the toggle means being arranged for operation in response to alignment of a record substantially coaxially of the turntable to operate the reversing switch from its reverse state to its forward state and for operation in response to movement of the cartridge inwardly of the turntable to operate the reversing switch from its forward state to its reverse state, the toggle means including a shaft, a cam mounted on the shaft for rotation relative thereto, the reversing switch being arranged for operation by the cam, bistable resiliently biased over-center means coupled to the cam for urging the cam into two discrete states angularly of the reversing switch, said cam states corresponding to the reversing switch state, the over-center means in the reverse state of the cam being disposed to interfere with and be displaced by alignment of a record coaxially of the turntable for operating the cam into its forward state in response to said alignment of a record with the turntable, a cartridge return lever secured to the shaft and arranged in the normal forward state of the cam to engage the cartridge intermediate the movement thereof relative to the turntable and to be driven by subsequent tracking movement of the cartridge, and means coupled to the shaft for operating the over-center means to drive the cam into its reverse state in response to driven movement of the cartridge return lever, the toggle means and the cartridge return lever being arranged to maintain the cartridge radially outwardly of the turntable in the reverse state of the cam.

15. A record player according to claim 14 including means coupled to the shaft and responsive to axial movement of the turntable for moving the cartridge return lever from its cartridge maintaining position to intermediate the path of movement of the cartridge.

16. A record player comprising a record turntable having an axis of rotation about which the turntable is rotatable and along which the turntable is movable, stop means defining a limit of movement of the turntable along said axis, turntable drive means including a single reversible motor for moving the turntable along its axis toward and away from said limit and for rotating the turntable at a selected angular velocity when the turntable is at said limit and constrained from movement along its axis, a rotatable record clamp disc disposed coaxially of the turntable engageable substantially at said limit of turntable axial movement with a record supported on the turntable for clamping the record to the turntable, a housing for enclosing the turntable, the clamp disc and the turntable drive means, the housing including a chassis, a slot through a front portion of the housing extending perpendicular to the turntable axis and through which a record may be inserted into the record player, the turntable axis lying rearwardly of substantially the midlength of the slot, locating means in the housing for guiding a record inserted through the slot into substantially coaxial alignment with the turntable between the turntable and the clamp disc, circuit means in the housing for controlling operation of the motor including start switch means coupled between the motor and a source of power for the motor and operable for connecting the motor and the source, the circuit means including reversing switch means having a forward state corresponding to operation of the turntable drive means for driving the turntable along its axis to said limit to clamp a record between the turntable and the clamp disc and for rotating the record at a selected speed for playing the same, the reversing switch means having a reverse state corresponding to the operation of the turntable drive means for driving the turntable along its axis away from said limit to unclamp a record from between the turntable and the clamp disc, and means responsive to engagement of a record with the locating means for operating the start switch means to connect the motor and said source.

17. A record player according to claim 16 including means coupled to the turntable and responsive to axial movement thereof for maintaining the start switch means operated during movement of the turntable along its axis from a selected location spaced from said limit to said limit and back to the selected location.

18. A record player according to claim 16 including means responsive to normal completion of play of a record clamped between the turntable and the clamp disc for operating the reversing switch means from its forward state to its reverse state.

19. A record player comprising a. a record turntable having an axis of rotation about which the turntable is rotatable and along which the turntable is movable, b. stop means defining a limit of movement of the turntable along said axis, c. a single reversible motor for moving the turntable along its axis toward and away from said limit and for rotating the turntable in a forward direction at a selected angular velocity when the turntable is at said limit, d. screw means concentric to said axis coupled between the motor and the turntable and rotatable about said axis in response to operation of the motor, e. means effective upon the turntable during a portion of the axial movement thereof spaced from said limit for inhibiting rotation of the turntable about said axis, and f. means operative upon the turntable at said limit for preventing reverse direction rotation of the turntable.

20. A record player comprising a record turntable having an axis of rotation about which the turntable is rotatable and along which the turntable is movable, stop means defining a limit of movement of the turntable along said axis, turntable drive means including a single reversible motor for moving the turntable toward and away from said limit and for rotating the turntable at a selected angular velocity when the turntable is at said limit and constrained from movement along its axis, a rotatable record clamp disc disposed coaxially of the turntable engageable substantially at said limit of turntable axial movement with a record supported on the turntable for clamping the record to the turntable, the turntable drive means further including screw means coupled between the turntable and the reversible motor for moving the turntable axially toward and away from the clamp disc, a stylus cartridge mounted for record tracking movement radially of the turntable, circuit means for controlling operation of the motor, the circuit means having a forward state corresponding to operation of the drive means to move the turntable toward said limit of axial movement and to rotate the turntable at said selected velocity and a reverse state corresponding to operation of the drive means to move the turntable away from said limit, and means for selecting between the forward and reverse states of the circuit means and arranged for operating the circuit means in its forward state in response to location of a record substantially coaxially of the turntable and for operating the circuit means in its reverse state in response to movement of the cartridge inwardly of the turntable.

21. A record player according to claim 20 including means effective during reverse state operation of the circuit means for inhibiting rotation of the turntable in a direction opposite to a direction corresponding to record playing rotation of the turntable.

22. A record player according to claim 21 wherein the screw means is disposed coaxially of the turntable.

23. A record player according to claim 20 including means effective upon the turntable when the turntable is located away from the limit of axial movement thereof for inhibiting rotation of the turntable.

24. A record player according to claim 20 wherein the means for selecting between the states of the circuit means includes reversing switch means operable in response to movement of the cartridge inwardly of the turntable for shifting the circuit means from its forward state to its reverse state.

25. A record player according to claim 24 including reject means operable independently of movement of the cartridge inwardly of the turntable to operate the reversing switch means to shift the circuit means from its forward state to its reverse state.

26. A record player according to claim 20 wherein the circuit means includes a power switch having an ON state in which said switch is effective to connect the turntable drive means to a source of power therefor and an OFF state, and means for operating the power switch into its ON state in response to alignment of a record substantially coaxially of the turntable.

27. A record player according to claim 26 including means responsive to location of the turntable within a selected distance of said limit for maintaining the power switch in its ON state.

* * * * *

PO-1050
(5/69)

UNITED STATES PATENT OFFICE
CERTIFICATE OF CORRECTION

Patent No. 3,658,347 Dated April 25, 1972

Inventor(s) Robert G. Cheeseboro

It is certified that error appears in the above-identified patent and that said Letters Patent are hereby corrected as shown below:

Col. 3, line 17, delete "a", second occurrence;
line 43, delete "a", second occurrence.
Col. 4, line 61, "on" should be --to--;
Col. 5, line 60, "than" should be --then--;
Col. 7, line 24, "the", third occurrence, should be --a--.
Col. 8, line 74, "open" should be --operate--.
Col. 9, line 5, "in" should be --is--.
Col. 10, line 9, "positioned" should be --position--.
Col. 13, line 32, "is" should be --in--.
Col. 16, line 24, "rotated" should be --rotates--;
line 35, delete "is movable, stop means";
line 36, delete "defining a limit of movement of the turntable".
Col. 17, line 39, delete "the", first occurrence.

Signed and sealed this 26th day of December 1972.

(SEAL)
Attest:

EDWARD M.FLETCHER,JR.
Attesting Officer

ROBERT GOTTSCHALK
Commissioner of Patents